United States Patent Office 2,723,698
Patented Nov. 15, 1955

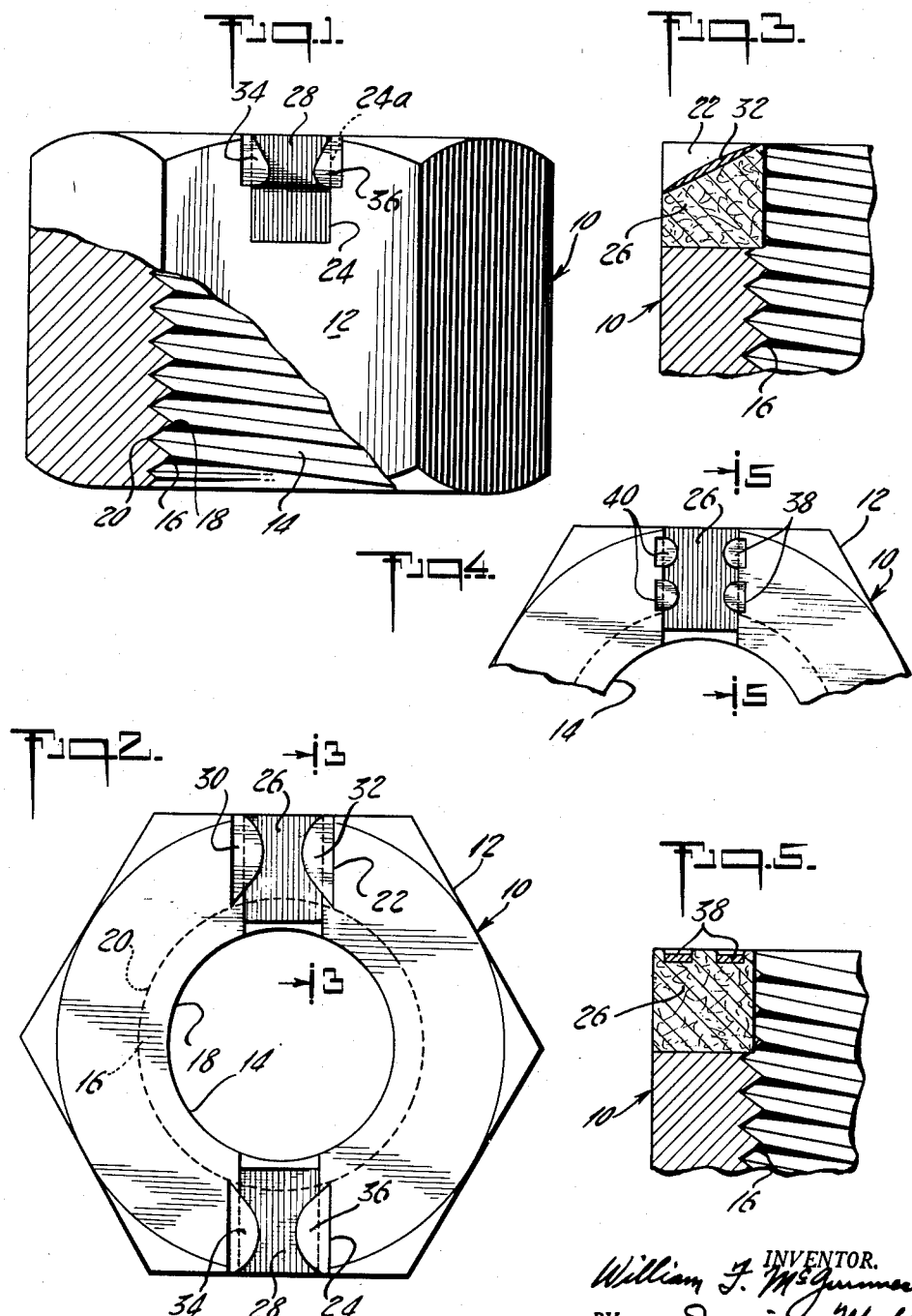

2,723,698

LOCK NUT WITH LAMINATED ELASTIC INSERT

William F. McGuinness, Union, N. J., assignor to Elastic Stop Nut Corporation of America, Union, N. J., a corporation of Delaware Application July 14, 1950, Serial No. 173,807

2 Claims. (Cl. 151—7)

The present invention relates to self locking nuts and has particular reference to self locking nuts of the kind in which locking action is secured by the aid of an insert of thread impressionable elastic material fixed in the nut body to be traversed by and have a thread impressed by the thread of the element on which the nut is screwed.

Nuts of the above generally defined kind are well known in the art and have been highly successful, particularly that type in which the insert is in the form of a collar fixed around the threaded bore of the nut at one end of the bore. Other types of inserts have also been employed, in which the insert is in the form of a plug fixed in the wall of the nut to be traversed by the thread of the mating element.

While certain designs of such nuts have met with commercial success, the market for them has been relatively limited as compared with the mass market for screw threaded fastenings making use of nuts, because of the factor of cost, and the general object of the present invention is the provision of a novel form of nut, of the kind under consideration, which, while providing sufficient locking power to meet the requirements of the mass market, can be manufactured and sold at a price acceptable to that market. With that and other and more detailed objects in view, the invention contemplates the provision of a nut structure comprising a nut body in which two diametrically opposed locking inserts are fixed in the body at one end of the bore to be traversed by the mating thread, the more specific nature of the construction adapted to carry the invention into effect being best understood from the ensuing portion of this specification, taken in conjunction with the accompanying drawings, which disclose by way of example but without limitation, examples of nuts embodying the invention.

In the drawings:

Fig. 1 is a side elevation, partly in section, of a nut embodying the invention;

Fig. 2 is a top plan view of the nut shown in Fig. 1;

Fig. 3 is a fragmentary section taken on the line 3—3 of Fig. 2;

Fig. 4 is a fragmentary top plan view of another embodiment of the invention; and Fig. 5 is a fragmentary section taken on line 5—5 of Fig. 4.

Referring now to Figs. 1 to 3, 10 indicates the body of a nut of the common hexagonal type provided with the wrenching flats 12 and bore 14 having thread 16, the minor diameter of the thread being indicated at 18 and the major diameter at 20. So far as the present invention is concerned the external wrenching surface may be as desired, as well as the specific material of the body and thread size. Ordinarily the body is of metal such as steel, brass, aluminum or any of the usually employed alloys.

At one end the body of the nut is slotted, preferably as shown in the figures, diametrally across the end face of the body to provide two aligned radial slots 22 and 24 extending through the wall of the nut from the bore to the outer faces. These slots are preferably formed of uniform rectangular section and may readily be formed by rapid and cheap manufacturing processes of known kind such for example as cold up-setting in nut forming machines or by sawing, the procedures used in making common castellated nuts being applicable.

After the nut bodies have been formed and tapped, locking inserts 26 and 28 of elastic material of a kind capable of having a thread impressed therein are placed in the slots, the cross section of the inserts preferably being such as to fill the cross section of the slots and the inner ends of the inserts extending inwardly past the major diameter 20 of the thread so as to be traversed by and have a thread impressed therein by the companion or complementary thread of an element on which the nut is screwed.

Except for the elastic compression and plastic deformation of the insert resulting from the impression of a thread therein the inserts must be firmly fixed in the body of the nut and this can readily be accomplished by rapid and cheap assembly operations on dial presses or like high speed equipment of known kind, by a punching operation which accomplishes what is in effect a broaching of portions of the side walls of the slot to form staking projections which project inwardly from the side walls of the slot and are imbedded in the material of the insert.

Since the inserts are located in open slots the form of the projections should be such as to particularly resist upward displacement of the insert from the slot and also radial displacement in outward direction, since the forces exerted on the insert and tending to displace it when the thread is being impressed are upward and radially outward.

In the embodiment shown in Figs. 1 to 3 a preferred form of staking projection is shown, the outer corners of the side walls of the slots which as originally formed are located as shown in dotted lines at 24a, being broached to provide staking projections 30, 32 and 34, 36 sloping outwardly and downwardly and being imbedded in and partially overlying the upper face of the insert. Such staking projections can readily be made in a single operation by a tool having a flat inclined face which also compresses the outer portion of the insert.

As will be noted particularly from Fig. 3 the form and location of the staking projections is such as to effectively resist the combined radial and axial thrust tending to displace the insert when the nut is applied. Obviously, the staking projections should be confined to that portion of the nut body lying radially outside of the major diameter 20 of the thread so as not to interfere with the companion thread when the nut is applied.

Other specific forms of staking may be used and by way of example there is shown in Figs. 4 and 5 another kind of staking particularly suitable for nuts of relatively large size and heavy wall thickness. In this embodiment a plurality of substantially semi-cylindrical staking projections 39 and 40 are formed by broaching the upper portions of the side walls of the slot. Still other forms of staking may be utilized.

So far as the material of the inserts is concerned any of the known materials suitable for such purpose may be employed. Of the known materials which have proven to be satisfactory in service the two most satisfactory materials developed up to the present time are compressed laminated fibre and the synthetic thermoplastic material well known under the trade name of "Nylon."

While both of these materials are satisfactory, one of the primary objectives of the present invention is to produce a satisfactory self locking nut of the kind under consideration at minimum cost, and since fibre of the kind commonly utilized for the purpose is very much cheaper than nylon, the use of fibre is indicated in most instances for nuts embodying this invention. When using fibre, account should be taken of the fact that the disposition of the locking inserts in the body of the nut is materially different from constructions heretofore employed, in that in accordance with this invention the upper surface of the insert is not confined by metal of the body except for the relatively small portions which the staking projections overlie and which may be radially at some distance outward from the inner end portion of the insert into which the thread is impressed. Because of the laminated nature of the fibre and the absence of confinement by metal of the nut body vertically between confronting confining metal faces, the impression by the threads of the companion element circumferentially across the face of the insert might result in separation of the material along the planes of the laminations if the inserts were placed in the slots with the laminations in planes transverse to the axis of the bore as has been the case in past practice, particularly with collar type nuts in which the insert is received in a well and retained in the well by a continuous circumferential rim inturned over and confining the upper face of the insert. Consequently, in accordance with one of the aspects of the present invention, when laminated fibre inserts are impressed the inserts are placed in the slots with the laminations extending parallel with the axis of the bore of the nut, so that any tendency of the laminations to separate and spread when the thread is impressed is prevented by the confinement of the insert between the fixed confronting side walls of the slot.

I am aware of the fact that self locking nuts deriving their locking action from elastic inserts in which threads are impressed have heretofore been made not only in forms in which the insert is in the form of a collar but also in forms in which the insert is in the nature of a plug extending through a bore in the side wall of the nut. While the collar type nut is commercially satisfactory no method has yet been evolved for making the nut at sufficiently low cost for the requirements of the mass market. With plug type nuts as heretofore made, in an attempt to produce an effective nut at lower cost than the collar type, single plugs have been and are used, claims for improved locking action being made for the single plug type based on the eccentric loading produced by the single elastic plug and tending to force the flanks of the threads opposite the plug into tight engagement. I have found however that such claims cannot be substantiated by actual test and that superior holding power is obtained when opposed plugs are employed which effect concentric lateral loading of the threads due to the compression of the inserts and by virtue of the structural aspects of the present invention, as compared with the use of inserts located in bores in the nut wall, I am enabled to make use of the preferred construction employing at least two inserts, without appreciable increase in cost as compared with the cost of a nut having only a single insert. This is due primarily to the locating of the inserts in open slots and the comparative ease with which the inserts can be fixed in such slots by a single staking operation capable of being performed by a single tool working axially against an end face of the nut. Obviously, insofar as the number of inserts employed is concerned, this may vary within the scope of the invention but two diametrically opposed inserts are to be preferred since that number affords adequate holding power for the intended purpose and is substantially no more expensive to produce than the less effective single insert arrangement.

While for purposes of disclosure, suitable practical examples of nut structures for carrying the invention into effect have been described and illustrated, it will be understood that the scope of the invention is not limited thereby and includes all forms of construction falling within the scope of the appended claims.

What is claimed:

1. A self locking nut comprising a body having a threaded bore, one end of said body being diametrally slotted to provide two aligned radial slots open at the end of the nut and extending through the wall of the nut at opposite sides of the bore, and a locking insert of laminated elastic thread impressionable material in each of said slots, the laminations of said material extending axially and radially of said bore and the inner ends of the inserts extending inwardly beyond the major diameter of the thread of the nut to be traversed by and have a thread impressed therein by a complementary thread, and portions of the side walls of said slot at the end of the nut being deformed downwardly from the end surface of the nut to provide staking projections located radially entirely outside the major diameter of the thread and projecting toward each other in confronting relation to grip the material of the inserts and fix the inserts in the nut body.

2. A nut as set forth in claim 1 in which said staking projections are formed from material displaced from the upper outer corners of the side walls of the slots and slope outwardly and downwardly along the sides of the slots.

References Cited in the file of this patent

UNITED STATES PATENTS

| 180,064 | Rebasz | July 18, 1876 |
| 298,843 | Gissinger | May 20, 1884 |
| 1,323,571 | Bennett | Dec. 2, 1919 |
| 2,392,704 | Simmons | Jan. 8, 1946 |
| 2,445,172 | Gravinese | July 13, 1948 |
| 2,462,603 | Boots | Feb. 22, 1949 |

FOREIGN PATENTS

| 633,093 | Great Britain | Sept. 12, 1899 |
| 372,405 | Great Britain | May 9, 1932 |